United States Patent Office 2,782,219
Patented Feb. 19, 1957

2,782,219

METHOD FOR PREPARING POLYFUNCTIONAL ORGANIC COMPOUNDS IN A FLAME AND HYDROPEROXY ORGANIC COMPOUNDS PREPARED THEREBY

Charles S. Cleaver, Wilmington, Del., assignor to E. I. du Pont de Nemours and Company, Wilmington, Del., a corporation of Delaware No Drawing. Application November 6, 1952, Serial No. 319,170

26 Claims. (Cl. 260—465.8)

This invention relates to a new method for effecting chemical reaction. More particularly, this invention relates to a new process for producing from simple raw materials chemical products or intermediates of increased molecular weight and especially products containing additional functional groups per molecule.

Synthetic organic chemistry has advanced tremendously since the days of Wöhler and his classical urea synthesis until today it is the basis for a large and important segment of the world's commerce. Fundamental to this synthetic organic chemical industry is the conversion of simple raw materials to more complex materials designed for specific usage in many desired fields. Practically all of the known commercial processes involve such conversions and particularly the introduction of functional groups into simple raw materials. These functional groups are involved in intermediate stages of formation of the desired product or are retained in the end product for ultimate reaction in the desired use.

Accordingly, much of the research attention over the years has centered on these conversions. However, despite the vast amount of time and effort devoted to this study, this fundamental step remains the most expensive, time consuming, and difficult part of the preparation of the desired organic compounds. This is particularly true in the preparation of those compounds of increased functionality. In many instances highly reactive raw materials are used, frequently under extreme conditions of temperature and pressure, and reactors of some kind are always required which frequently are expensive and of relatively short service life. Thus, there has existed for a long time the need for a simple, direct, and inexpensive method of effecting organic reactions to produce synthetic chemical materials required in the modern chemical arts and industry.

It is an object of this invention to provide a new process for effecting chemical reaction. Another object is to provide a new fundamental, direct, simple and inexpensive method for rapidly effecting chemical reaction of organic compounds. A further object is to provide a novel process for converting relatively simple organic compounds to more complex organic compounds of increased molecular weight. A still further object is to provide a new process for introducing functional groups into organic compounds. An additional object is to provide a new process for preparing polyfunctional organic compounds, particularly bifunctional organic compounds, from monofunctional organic compounds. Other objects will appear hereinafter.

These, and other objects of this invention are accomplished by the following process which comprises contacting an aqueous dispersion of an organic compound having at least one functional group and a hydrogen-bearing carbon atom with an oxygen-containing fuel combusting mixture having a normal combustion wave, maintaining the aqueous dispersion of said organic compound in intimate mixture with said combusting mixture in a zone where the temperature of said combusting mixture is at least 1500° F. measured at standard atmospheric pressure, removing the aqueous dispersion thereby obtained from contact with said combusting mixture before complete combustion of said organic compound occurs, collecting the aqueous dispersion thus removed and separating therefrom a monomeric organic product having an additional functional group and of higher molecular weight than the organic compound originally contained in said aqueous dispersion. The aqueous dispersion of the organic compound after removal from the combusting mixture is preferably recycled into intimate mixture with and removed from the combustion mixture as aforesaid. This recycling can be repeated a number of times to increase the conversion of the desired products.

It has now been discovered that organic compounds having at least one functional group and a hydrogen-bearing carbon atom can be converted to monomeric organic products of higher molecular weight and of higher functional order by the following process which comprises effecting intimate contact between an aqueous dispersion, preferably containing at least 5% liquid water by weight, of an organic compound having at least one functional group and a hydrogen-bearing carbon atom and the zone of a combusting mixture which is at a temperature of at least 1500° F. (measured at atmospheric pressure), said combusting mixture having a normal combustion wave; maintaining contact between said aqueous dispersion and said zone for a period of time such that complete combustion of the said organic compound does not occur; breaking contact between said dispersion and said zone; and collecting the aqueous dispersion thereby obtained and isolating therefrom monomeric organic products of higher molecular weight and of higher functional order than the original organic reactant. The term "aqueous dispersion" as used herein includes both heterogeneous and homogeneous aqueous molecular dispersions, the latter being more commonly called aqueous solutions (see pages 145 and 423 of Washburn "Principles of Physical Chemistry," 2nd ed., McGraw-Hill, 1921).

Certain of the products obtained in this process are new compounds and are also a part of this invention. These new compounds are hydroperoxides which are characterized by having in their molecular structure, in addition to the hydroperoxy group, at least one other negative functional group which is joined to the said hydroperoxy group through a divalent saturated, aliphatic hydrocarbon radical containing at least one hydrogen-bearing carbon atom which said radical is directly attached to the hydroperoxy group by said hydrogen-bearing carbon atom, said negative functional group being a carboxyl group or groups hydrolyzable thereto. These new hydroperoxides are further characterized in exhibiting a positive test for the hydroperoxy group in the manner of Criegee, Fortsch. der Chem. I, 508 (1950) and Ber. 72, 1799 (1939), and, in addition, by being reduced to alcohols with aqueous sodium sulfite solution in the manner of Hoch et al., Ber. 75, 313 (1942).

These new functionally substituted hydroperoxides can also be described by the following general structural formula HOORX, wherein HOO is the hydroperoxy group; R is a divalent aliphatic hydrocarbon radical free of aliphatic unsaturation and Zerewitinoff active hydrogen and of no more than six carbons, and X is carboxyl or groups hydrolyzable directly thereto.

The combusting mixtures include combusting oxygen-containing fuel compositions having normal combustion waves as obtained under both oxidizing and reducing conditions, i. e., compositions which after passage through the normal combustion wave contain excess amounts of oxygen or fuel, respectively. The zone in which the process of this invention can be carried out includes the said normal combustion wave itself and all areas adjacent thereto which are also at a temperature not less than about 1500° F. measured at standard atmospheric pressure. However, such zones arising from combustion of the above-defined fuel compositions are included within this invention whether operated at atmospheric, superatmospheric, or subatmospheric pressures. Under subatmospheric pressure, the reaction zone in most instances will be somewhat greater in size than in the same combusting mixture at atmospheric pressure and will exhibit temperatures lower than 1500° F. At superatmospheric pressures, the reaction zone will again be somewhat larger and corresponding sections of the zone will be at higher temperatures than in the same combusting mixture at atmospheric pressure. However, when measured at standard atmospheric pressure in any given combusting mixture, the operable reaction zone is defined as that which exhibits a temperature of at least 1500° F.

For reasons of higher conversions in shorter times to the desired products of higher molecular weight and higher functional order, it is preferred to carry out the reaction in the zone which is at a temperature of at least 1500° F. in a combusting mixture having a normal combustion wave which is propagated at a velocity of at least 30 cm./sec., and most preferably at a velocity of at least 90 cm./sec. or greater. Because of even higher conversions and yields in even shorter times, the preferred reaction zone is that in a combustion mixture which exhibits a temperature of at least 2500° F., particularly in a combusting mixture having a normal combustion wave which is propagated at a velocity of at least 30 cm./sec., and most preferably at a velocity of at least 90 cm./sec. or greater. Particularly outstanding results are obtained when the normal combustion wave itself and the zone of maximum temperature closely proximate thereto constitute parts of the reaction zone, especially in those combusting mixtures wherein the said wave is propagated at a velocity of at least 90 cm./sec. or greater and especially 300–1000 cm./sec. or greater. It is to be noted that these zones of maximum temperature for such combusting mixtures are generally at a temperature of 3000–4000° F. or higher, e. g., 6800° F.

The contact time of the aqueous dispersion with the above-defined reaction zone is quite critical. It obviously must not be of such duration as to cause complete combustion of the organic reactant, i. e. to raise the average temperature of the entire aqueous dispersion of the organic reactant to the combustion temperature of the said reactant and, of course, the products therefrom obtained in the process. Preferably, the contact time will be of such duration that the average temperature throughout the said aqueous dispersion will not reach the boiling point of the water component under the pressure being used. In the preferred operating conditions, the reaction or contact time will range from 0.00001 to 5.0 seconds, and normally from 0.0001 to 1.0 second. The most preferred and most generally used contact times lie within the range 0.001–0.250 second.

The fuel compositions useable in the process of this invention include all those which contain oxygen either in combined form or in admixture as molecular oxygen in amounts such that the available oxygen is sufficient to support combustion, i. e., in amount ranging from the lower to the upper explosive limit of the particular fuel component or mixture of components involved. The fuel component of the said fuel compositions can be any compound or mixture of compounds which in combination with the above described quantities of available oxygen can be made to combust and in so doing propagate a normal combustion wave.

In the foregoing description of this invention, many terms familiar to the combustion art have been used. These are adequately described in greater detail in many standard reference publications, probably the most definitive of which at present is "Combustion, Flames and Explosions of Gases," Lewis & Von Elbe, Academic Press, 1951. For instance, a definition of combustion wave will be found in said publication at page 226, wherein it is pointed out that in a combustion process the flow of heat from the ignition source initiates chemical reaction in an adjacent layer of the explosive medium so that the layer itself becomes the source of heat. In this way a zone of burning propagates through the medium. The zone constitutes a wave and will be referred to as a combustion wave. In the same text at page 166 a "normal" combustion wave is specifically defined as one in which the temperature rises steeply from the initial temperature to the combustion temperature corresponding to approximately adiabatic transition to thermodynamic equilibrium. Within this wave there are no discontinuous stages of chemical transformation associated with different reaction mechanisms. Similarly, a suitable discussion of combustion wave propagation velocity including both methods for determination and specific data for many representative combustion waves will be found in the above text at pages 459–468. Data on representative temperature profiles for certain specific combustion processes appear in the same text at pages 260–265.

The temperatures of the combustion gases in all instances described and referred to herein are those as obtained by the line reversal method (see, for instance, Fery, Compt. rend. 137, 909 (1903)) or other reliable methods (see, for instance, Kohn, Annal, physik. 44, 749 (1914)). Some of the simplest classes of the thus defined combustion waves, in probably their most common form, occur in the well recognized class of flames, both laminar and turbulent, in which the combustion wave represents the extremely thin visible junction section between the inner cone of the visible flame and the outer broadened stream of combustion products. This area is extremely thin and at atmospheric pressure, for instance, will normally range from 0.01 to 1.0 mm. in thickness, which is usually referred to as wave width (see "Combustion, Flames and Explosions of Gases," supra, at pages 231–238).

The input reactants for utilization in the process of this invention are organic compounds containing at least one hydrogen bearing carbon and at least one functional group. This functional group is preferably bonded to a carbon atom carrying no hydrogen.

Particularly outstanding because of the high utility of the products obtained therefrom are those compounds of the aforesaid type having at least one negative functional group such as halogen, e. g., chlorine; hydroxy and derived functional groups, e. g., ether, hydroperoxy, peroxy, aldehyde, keto and the corresponding analogous sulfur-bearing negative functional groups, e. g., thioether, thioaldehyde, sulfoxy, sulfone, and the like; primary, secondary, and tertiary amino groups and precursors thereto and derivatives thereof, e. g., amine acid salt, amine oxide, nitro, imino, nitroso, and the like; acyl groups and precursors thereto, e. g., nitrile, carboxyl, carboxyester, primary, secondary, and tertiary carboxamide, including the corresponding thiolo and thiono functional groups, e. g., carbothiolic, dithiocarboxylic, thionocarboxamide, as well as the corresponding sulfonic acid groups including the acid, ester, and primary, secondary, and tertiary amides. A particularly advantageous aspect of the process of this invention lies in the easy and direct synthesis of functional and polyfunctional organic compounds composed of units of more than one type as obtained by using mixtures of the above broadly disclosed organic reactants.

This invention is further illustrated, but not limited, by the following examples, in which the parts are by weight except for the data given on the various fuel/oxygen compositions which are in parts by volume.

Example I

A homogeneous molecular dispersion, i. e., a solution of 3 parts of pivalic acid in 150 parts of water (pH about 2.0) was passed in the form of a cylindrical stream about 0.022 inch in diameter and at a rate of about 50 parts per minute through the tip portion of the inner cone (i. e., twice through the combustion wave) of a hydrogen-oxygen flame burning at atmospheric pressure (maximum temperature about 4150–4350° F. and normal combustion wave propagation velocity about 600 cm./sec.). The input rate of each of the burner gases was maintained at about 3 liters per minute under slightly super-atmospheric pressure with premixing of the gases in a small chamber in the burner nozzle. The burner used was a commercially available handtorch with a nozzle having an orifice of about 65–70 mils inside diameter, in particular a Precision Scientific Company, National Type 3A blowpipe with an OX-3 nozzle. The total contact times of the aqueous solution of pivalic acid were with: (a) the total flame cross-section, about 3 milliseconds, i. e., 0.003 second; (b) the zone of at least 1500° F., about 4–5 milliseconds, i. e., 0.004–0.005 second; and (c) the normal combustion wave, about 0.01 millisecond, i. e., .00001 second. The input temperature of the aqueous pivalic acid solution was about 75–80° F. and the aqueous solution exited from the flame zone at about 95–125° F.

After passage through the flame the aqueous reaction mixture was collected directly in a vessel cooled in an ice/water bath. The solution was then recycled through the flame and normal combustion wave in the manner previously described for a total of ten passes. Upon continuous ether extraction of the aqueous reaction mixture for 16 hours in a counter-current, liquid-liquid extractor, separation of the ether extract, drying over anhydrous magnesium sulfate, and removal of the ether by evaporation in a stream of nitrogen at room temperature, there was obtained a mobile, oily, liquid residue. From this by chromatographic separation and identification in the manner of Marvel and Rands, J. Am. Chem. Soc. 72, 2642 (1950), there were obtained about 1.9 parts (corresponding to 63.3% recovery) of the starting material, pivalic acid, and the following reaction products: about 0.3 part (9.2% yield) of 2,2,5,5-tetramethyladipic acid, about 0.1 part (7.9% yield) of hydroxypivalic acid, and about 0.2 part (13.8% yield) of an acid characterized as hydroperoxypivalic acid. The total yield of products thus is about 31%, based on the amount of pivalic acid consumed.

The pivalic acid exhibited the characteristic peak elution volume for the acid, a neutral equivalent of 102 (theory 102), and a melting point of 35° C., a reported value being 35.3–35.5° C. (Butterow, Ann. 170, 158). The 2,2,5,5-tetramethyladipic acid exhibited a neutral equivalent of 107 (theory 101); a melting point of 191–193° C., a reported value being 191° C. (Farmer et al., J. Chem. Soc. 1926, 2322); a mixed melting point of 191–192° C. with an authentic sample of the acid; and the characteristic peak elution volume for the acid. The hydroxypivalic acid exhibited the characteristic peak elution volume for an authentic sample of the acid (see Blaise et al., Bull. Soc. Chim. (3) 31, 110, 155, 308). The hydroperoxypivalic acid exhibited a positive test for the hydroperoxy group with lead tetraacetate in the manner of R. Criegee, Ber., 72, 1799 (1939), and by treatment with neutral sodium sulfite solution (which is known to reduce the hydroperoxy group to the hydroxyl group, Hoch et al., Ber. 75, 313 (1942)), was converted to hydroxypivalic acid as evidenced by the characteristic peak elution volume therefor.

Although the above results have been obtained with aqueous pivalic acid solutions at pH about 2.0, essentially the same results are obtained with pivalic acid solutions at pH's ranging up to 10.0. Although the above results represent oxidizing flame conditions, essentially the same results are obtained with similar flames ranging upward and downward in relative oxygen content to and including the upper and lower explosive limits for hydrogen/oxygen and other fuel/oxygen flames.

Substantially the same results were also obtained using in place of the above 50/50 hydrogen/oxygen, oxidizing combustion wave a 33/67 city gas/oxygen oxidizing flame (maximum temperature about 4700–4900° F., and normal combustion wave propagation velocity about 300 cm./sec.). The city gas used contained 60% paraffins (51.9% methane and 8.1% ethane), 13.6% hydrogen, 4.2% oxygen, 2.0% carbon monoxide, 1% total carbon dioxide and hydrogen sulfide, 0.7% ethylene, and the remainder (18.5%) inert material, which was almost exclusively nitrogen.

Example II

A solution of 5.85 parts of acetic acid in 300 parts of distilled water was passed through the tip portion of the inner cone (i. e. twice through the normal combustion wave) of a 50/50 hydrogen/oxygen flame exactly in the manner described in Example I. The process was again carried out for a total of ten cycles and the products isolated by ether extraction, drying, removal of the ether by distillation at steam bath temperature under atmospheric pressure and removal of unreacted acetic acid by evaporation in a stream of nitrogen at room temperature.

From the mobile liquid thus obtained, there were isolated by chromatographic separation and identification techniques as in Example I, 5.53 parts (corresponding to 94.5% recovery) of the starting material, acetic acid, and the following reaction products: hydroxyacetic acid in 2.3% yield, an acid characterized as hydroperoxyacetic acid in 4.5% yield, and succinic acid in 5.1% yield. Thus, the total yield of products was 11.9% and this in only ten passes through the tip portion of the inner cone of the flame for a total process time of one hour.

The hydroxyacetic and succinic acids exhibit the same characteristic peak elution volumes as authentic samples of the acids (see German Patent 463,139 and 473,262). The hydroperoxyacetic acid was further identified by a positive test for the hydroperoxy group with lead tetraacetate in the manner of Criegee, supra, and in addition by reduction, through reaction with sodium thiosulfite (see Hoch, et al., supra), to hydroxyacetic acid which was identified as above.

Substantially the same results, varying only in relative yields, were obtained using, in place of the above 50/50 hydrogen/oxygen oxidizing combustion wave, 75/25 and 86/14 hydrogen/oxygen reducing flames, having, respectively, maximum temperatures of about 4500° F. and 4150–4350° F. and normal combustion wave propagation velocities of about 875 and 600 cm./sec. Likewise, substantially the same results were obtained using 50/50 oxidizing and 72/28 reducing carbon monoxide/oxygen flames and 25/75 oxidizing and 40/60 reducing methane/oxygen flames having, respectively, maximum temperatures of about 5000–5100° F., 5200–5300° F., 4700–4900° F., and 5000–5100° F. and normal combustion wave propagation velocities of about 90, 100, 300, and 300 cm./sec. To illustrate the yield variance, there were obtained with the 25/75 methane/oxygen flame a 2.7% yield of hydroxyacetic acid, a 3.0% yield of succinic acid, and an 18% yield of an acid characterized as hydroperoxyacetic acid. In the case of the methane/oxygen flames significant quantities of propionic acid were also obtained in addition to the hydroxyacetic, hydroperoxyacetic, and succinic acids.

Example III

An aqueous solution of 6 parts of pivalonitrile in 400 parts of distilled water was passed through the tip portion of the inner cone of a 50/50 hydrogen/oxygen flame exactly as described previously in Example I. The reaction mixture was worked up in the same manner described previously and after ether extraction followed by removal of the ether solvent, there was obtained about 1 part of a viscous, oily mixture believed to contain pivalonitrile, hydroxypivalonitrile, hydroperoxypivalonitrile, and 2,2,5,5-tetramethyladiponitrile.

A sample of this mixture was hydrolyzed by heating with concentrated hydrochloric acid in a sealed tube for 18 hours at 100° C. Upon ether extraction of the hydrolysis product, isolation of the ether soluble product, and subsequent chromatographing as previously described, characteristic peak elution volumes for pivalic, hydroxypivalic, and 2,2,5,5-tetramethyladipic acids were obtained. Elution peaks for other as yet unidentified acids were also obtained. It is to be noted that the acid hydrolysis step used in this proof of the structure of the above products would destroy the hydroperoxy group of the hydroperoxypivalonitrile.

*Example IV*

A solution of 6 parts of propionic acid in 300 parts of distilled water was passed through the tip portion of the inner cone of a 50/50 hydrogen/oxygen flame for a total of ten cycles in the manner described in Example I. The aqueous reaction product thereby obtained was countercurrently and continuously extracted with ether, the ether extract dried, and the ether removed by heating gently on a steam bath until ether evolution stopped—all as described previously in Example I. There was thus obtained about 5.0 parts of a mixture of organic acids as a mobile oil smelling strongly of propionic acid. The propionic acid was removed by evaporation in a stream of nitrogen at room temperature over a period of one hour.

From the oily mixture of products remaining there were separated and identified by chromatographic means as in Example I: (a) alpha-hydroxypropionic acid in about 5.0% yield; (b) beta-hydroxypropionic acid in about 5.6% yield; and acid characterized as (c) alpha-hydroperoxypropionic acid in about 7.0% yield, an acid characterized as (d) beta-hydroperoxypropionic acid in about 5.1% yield; and acids characterized as (e) alpha-methylglutaric, (f) alpha,beta-dimethylsuccinic, and (g) adipic acids in total yield of about 5.2%. The total yield of products based on the propionic acid consumed is thus about 28%. Acids (a), (b), (e), (f), and (g) exhibited characteristic peak elution volumes for authentic samples of the respective acids (see, in order, Simpson et al., Comp. rend. 65, 416; Johansson, Chem. Zentr. 1916 II 557; Wislicenus, Ann. 233, 115; Beilstein, II, 665–667; and U. S. Patent 2,285,914). Acids (c) and (d) exhibited strongly positive tests for the hydroperoxy group in the manner of Criegee supra and when reacted with neutral sodium sulfite solution in the manner of Hoch et al., supra (see Example I), were converted to the corresponding known hydroxyacids (a) and (b) as evidenced by the characteristic peak elution volumes exhibited therefor.

*Example V*

A solution of 0.75 part of benzoic acid in 300 parts of distilled water was passed through the tip portion of the inner cone of a 50/50 hydrogen/oxygen flame for a total of ten cycles, in the manner as described in Example I. The aqueous reaction product thereby obtained was ether extracted, the ether extract dried, and the ether removed by evaporation at room temperature—all as previously described in Example I.

There was thus obtained about 0.5 part of light tan crystals exhibiting a positive ferric chloride test for hydroxy compounds and a positive test with starch and potassium iodide for peroxy compounds. From the mixture, by the previously described chromatographic technique, characteristic peak elution volumes for m-hydroxybenzoic and p-hydroxybenzoic acids were obtained (see Beilstein, X, 134, 149). Evidence was also obtained for the presence of other as yet unidentified carboxylic acids.

*Example VI*

A solution of 24 parts of tert.-butyl alcohol (freshly redistilled over potassium carbonate) in 600 parts of distilled water was passed through the tip portion of the inner cone of a 50/50 hydrogen/oxygen flame burning at atmospheric pressure for a total of ten cycles in the same manner as described in Example I. The products were isolated as described in Example II. After removal of the ether, there was obtained about 8–10 part liquid residue from which after removal of the tert.-butyl alcohol by evaporation at room temperature in a stream of nitrogen, there was finally obtained about one part of a viscous, colorless, oily product. (The remaining unaccounted for tert.-butyl alcohol was probably lost in the ether removal step due to its relatively high volatility.) To this oily product was added about eight parts of pure cyclohexane. The resulting mixture was warmed to about 40° C. and allowed to separate. The upper (cyclohexane) layer was removed by decantation and the cyclohexane removed therefrom by evaporation at room temperature in a stream of nitrogen. There was thus obtained about 0.5 part of a viscous colorless oily product. After repeating the cyclohexane extraction process, there was thus finally obtained about 0.250 part of a colorless oily product.

Approximately 0.100 part of this mixture was separated into two fractions by sublimation for four hours at 85° C. under a pressure corresponding to about 0.5 mm. of mercury. From the more volatile fraction on standing, rodlike crystals of 1,1,4,4-tetramethyltetramethylene glycol slowly formed. A sample of this product exhibited an X-ray spectra identical with that of an authentic sample of the glycol (see Zelinsky, Ber. 35, 2139). The least volatile reaction fraction, which comprises the majority of the product, is believed to be a mixture of 1,1-dimethylethylene glycol and hydroperoxytert.-butyl alcohol, probably in combination with additional quantities of 1,1,4,4-tetramethyltetramethylene glycol.

*Example VII*

A solution of 6 parts of acetic acid in 300 parts of distilled water was passed in the manner of Example I through the inner cone of a 40/60 ammonia/oxygen flame (maximum temperature about 4000° F. and normal combustion wave propagation velocity about 90 cm./sec.). The process was carried out for a total of 10 cycles and the reaction mixture was worked up in the same manner described previously. After ether extraction, followed by removal of the ether solvent, and subsequent separation and isolation by the previously described chromatographic procedures, there were obtained significant quantities of succinic acid, glycolic acid, exhibiting characteristic peak elution volumes for the acids, and, in major proportion, at least one nitrogen-containing carboxylic acid. It is believed on the basis of a positive ninhydrin test (see p. 1099, vol. II Gilman, "Organic Chemistry—An Advanced Treatise," 2nd ed., Wiley, 1943) that an alpha-aminoacyl compound or compounds was formed in the process, most likely an alpha-aminocarboxylic acid such as glycine, alpha-aminosuccinic acid, and the like.

*Example VIII*

A solution of 6 parts of acetic acid in 300 parts of distilled water was passed in the manner previously described through the inner cone of a 31/31/38 ammonia/hydrogen/oxygen flame (maximum temperature greater than 4000° F. and normal combustion wave propagation velocity greater than 90 cm./sec.). The process was again carried out for 10 cycles and the products were isolated, separated, and identified by: ether extraction, removal of the ether, and subsequent chromatographing—all as previously described. There were thus obtained significant quantities of succinic acid and glycolic acid—both of which exhibited characteristic peak elution volumes for these acids. There was also obtained, in major proportion, at least one nitrogen-containing carboxylic acid. On the basis of a positive ninhydrin test, there is believed to be an alpha-amino acid present, such as glycine, alpha-aminosuccinic acid, alpha,alpha'-diaminosuccinic acid, and the like.

Essentially the same results were obtained using a 7.5/60/32.5 ammonia/hydrogen/oxygen flame, except that in this instance an additional product was obtained. More specifically, using this latter flame (maximum temperature greater than 4000 F. and normal combustion wave propagation velocity greater than 90 cm./sec.), there were obtained significant quantities of succinic acid, glycolic acid, and hydroperoxyacetic acid, all of which exhibited the characteristic peak elution volumes of these acids as given previously in the foregoing examples. In addition, there was obtained, in major proportion, at least one nitrogen-containing carboxylic acid. On the basis of a positive ninhydrin test, there was believed to be present at least one alpha-amino acid.

The process of this invention requires intimate contact between an aqueous dispersion of an organic compound or compounds having at least one functional group and a hydrogen bearing carbon atom and the zone of a combusting mixture which is at a temperature of at least 1500° F., said mixture having a normal combustion wave. This essential process step can be achieved by moving the aqueous dispersion relative to the said zone, or vice versa, or by both of such means. The most convenient of the three means, from the standpoint of the equipment and handling thereof, involves the movement of the aqueous dispersion of the simple organic reactant relative to the said zone. One of the most convenient means of effecting such a step, primarily because of the ease of maintenance of the requisite combustion wave, involves the movement of the aqueous dispersion of the organic reactant with respect to said zone having a standing normal combustion wave as obtained from an oxygen-containing fuel composition burning in the form of a flame. By suitable means, such as pumps, storage vessels, pressure regulators, flow controllers, and other means known in the art for measuring and handling gaseous, liquid, or solid components, the said oxygen-containing fuel compositions can be supplied to a suitable apparatus equipped with ignition means in controlled amounts so as to maintain the requisite zone having a standing combustion wave.

The aqueous dispersion of the requisite organic reactant or reactants can be brought into the necessary zone, including actual contact with the said normal combustion wave, by many means. For instance, the aqueous dispersion can be in the form of a homogeneous molecular dispersion, i. e., an aqueous solution, and the said aqueous dispersion can be brought into the necessary position relative to the standing normal combustion wave in a single stream, multiple streams, flowing sheets, aerosols, sprays, or in the form of grosser droplets such as are obtained by suitably pressuring the said aqueous dispersion through a diaphragm of controlled porosity, such as the conventional sintered glass disks.

The normal combustion wave and the zone proximate thereto of the requisite temperature can likewise be in any shape or form as determined by the shape or form of the apparatus through which the oxygen-containing fuel composition is metered prior to ignition. For instance, the combustion wave or flame which can be single or multiple, can assume the more conventional conical form, or can be in special shapes, such as those emanating from slit burners and the like. The combustion waves or flames can also be laminar or turbulent, depending on the well known Reynold's numbers for the elements of the fuel composition.

One of the alternative procedures, i. e., causing the combustion wave to move relative to the aqueous dispersion of the organic reactant can most conveniently be achieved using totally gaseous fuel compositions by suitably supplying the necessary gaseous combustion components, either separately or in admixture, in bubble-form in a completely surrounding atmosphere of the said aqueous dispersion with suitable ignition means for effecting the formation of a normal combustion wave, i. e., exploding the said discrete gas bubbles. A specific illustration of such a procedure involves the metering of premixed gaseous combustion elements by suitable means into the bottom of a column of an aqueous solution of the organic reactant or reactants, allowing the thus formed gaseous bubbles to rise through the said column and pass through a zone having suitable and preferably repetitive ignition means thereby effecting explosion of the combustible fuel elements in the bubbles. Among suitable ignition means, there may be mentioned photochemical techniques, preferably in the additional presence of photochemical sensitizers such as traces of mercury of oxides of nitrogen; thermal means, e. g., suitably heated wires and the like; catalytic means and the like.

Much the same procedure can be carried out using a spray or aerosol of the said aqueous dispersion and counter-currently passing in bubble-form the necessary combustion components and similarly effecting ignition and combustion through the combustible gas bubbles resulting again in explosion of the said mixtures with the formation of the necessary normal combustion wave. Obviously the same effects can also be achieved by metering the oxygen and other necessary combustion components separately either counter or cocurrently provided that their mutual interface occurs in the ignition zone.

Although in the foregoing, specific embodiments as to the apparatus requirements and suitable means for carrying out the process of this invention have been given, it is to be understood that the present invention is by no means thus limited. Obviously, other types of apparatus and means for combining the various elements disclosed herein can be employed for effecting the process of this invention. The only requirement as to this portion of the invention is that an aqueous dispersion of the organic reactant or reactants specifically involved be brought into intimate contact with the at least 1500° F. zone of a combusting oxygen-containing fuel composition having a normal combustion wave, which preferably exhibits a propagation velocity of at least 30 cm. per second.

As a means of producing the requisite at least 1500° F. zone in a normally combusting mixture, any combustible fuel can be combusted with oxygen in an amount between the lower and upper explosive limits for the particular fuel, provided the combustion wave resulting therefrom is normal and, preferably, is propagated at a velocity of at least 30 cm. per second. It is within the scope of this invention to use mixtures of the fuel components. The oxygen necessary for effecting the combustion can be supplied in combined form with one or more of the fuel components or can be supplied separately or in admixture with the fuel component or components in the form of molecular oxygen. The only requisite as to the oxygen portion of the said fuel composition is that the available oxygen at the combustion site be present in amounts ranging from the lower to the upper explosive limit for the particular fuel composition, that is the fuel/oxygen composition must be combustible.

Suitable examples of the said fuel compositions, wherein the requisite oxygen is initially present in combined form, i. e., atomic form, are well known in the art. A particularly outstanding class of this type of self-contained combustible mixture will be found amongst the nitrosubstituted organic compounds, particularly those containing a relatively high proportion of nitro groups per carbon atom. Suitable specific illustrations of this type of compounds include nitromethane, trinitrotoluene, and the like.

Because of their greater availability, generally at low cost, and particularly readier handleability and greater ease of control, those fuel compositions are preferred wherein the requisite oxygen is supplied in uncombined form, i. e., as molecular oxygen, either separately or in admixture with the combustible fuel component or components being used. The necessary combustible fuel component or components which can be used are many and varied, (see, for instance, Walker et al., J. Am. Chem. Soc. 74, 3769 (1952)). For instance, all the hydrocarbons, both saturated and unsaturated, including polyunsaturated, aliphatic, aromatic, alkaromatic, araliphatic, cycloaliphatic, and like hydrocarbons can be used. The heterocyclic compounds and functionally substituted hydrocarbons and heterocyclic compounds can also be used such as alcohols, phenols, ethers, esters, ketones, and the like. Suitable specific illustrations of such compounds which can be used as the fuel component include methyl alcohol, acetone, diethyl ether, ethyl acetate, methane, benzene, cyclohexane, cyclohexene, butadiene, acetylene, ethane, and the like. The simpler organic and even inorganic compounds can also be used as the fuel component, for instance, carbon monoxide, hydrogen, and ammonia, the latter resulting in the formation of nitrogenous compounds in addition to those previously described.

For obvious reasons the relatively low cost, commercially available liquid or gaseous hydrocarbons, usually mixed, constitute a preferred source of the necessary normal combustion wave. The various fuel oils themselves, whether purified or not, also constitute a preferred source of the combustion wave. Obviously the more highly refined hydrocarbons such as gasoline or the like also constitute an excellent source of the combustion wave, but from a cost standpoint and also because of their greater utility in other important fields, they are not normally considered a preferred class of fuel for the present process. The solid fuels including the various wood residues, coal and peat products, and like allied, industrially available, usually low cost materials, can also be used as fuel components but are not completely satisfactory because of their lower maximum combustion temperatures and slower flame propagation velocities.

Because of increased handling ease and the low cost availability of many such compositions, the wholly gaseous fuel components are preferred. Amongst suitable examples of these, there may be mentioned: the natural gases, including producer gas, and other types normally encountered in the natural state from petroleum operations; the commercially produced combustible gases such as the so-called water, carbureted water, synthesis, blue, mixed coal, anthracite producer, coke oven, blast furnace, city gases, and the like; the liquid petroleum hydrocarbons, (LPH) which are commercially available under reasonably low pressures in liquid form easily expandible at atmospheric pressures to the gas phase and which usually contain various saturated and unsaturated hydrocarbons in the 2 to 4 carbon range, such as propane, butane, isobutane, ethane, propylene, and the like, normally in mixtures; as well as the previously mentioned hydrogen and carbon monoxide which, particularly the latter, appear in varying proportions in most of the above referred to commercially produced gases of the type of water gas and the like.

The oxygen necessary with all of the above detailed fuel components for producing the necessary combustion wave for use in the present invention and which is preferably supplied in the form of molecular oxygen, i. e., uncombined, can be supplied in pure form, if desired, or equally well in the form of air, the inert diluents of which have no untoward effect on the reaction. From a cost standopint, it is obviously preferred to supply the oxygen in the form of air, although in the case of some of the less rapidly combusting fuel components such as ammonia and the like it is preferred to use pure oxygen, or even ozone, in order to achieve a combustion wave with a sufficiently high propagation rate. Other diluents can be present in the oxygen as well, including, for example, such materials as carbon dioxide, rare gases and the like. Other oxygen sources which support combustion can also be used, such as the oxides of nitrogen, e. g., nitrous oxide, nitrogen dioxide, and the like.

As mentioned previously the organic reactants used in the process of this invention are those which contain at least one hydrogen bearing carbon atom and in addition carry at least one functional group singly and directly bonded to at least one carbon, which may or may not be the requisite hydrogen-bearing carbon atom. These organic reactants can be defined generically by the following formula:

wherein X, Y, and Z are hydrogen or an organic radical, at least one of which is a functional group, and can be alike or different, and any two of these organic radicals can be joined together to form with the indicated carbon a cyclic structure which can be carbocyclic or heterocyclic including oxa, aza, and thia heterocycles. More particularly, X, Y, and Z can be hydrogen; hydrocarbon including alkyl, aryl, alkaryl, aralkyl, or cycloalkyl, and heterocyclic; simple monofunctional groups including halogen, e. g., chlorine; hydroxy and derived functional groups, e. g., ether, hydroperoxy, peroxy, aldehyde, keto, and the corresponding analogous sulfur-bearing negative groups, e. g., mercapto, thioether, thionoaldehyde, sulfoxy, sulfone, and the like; primary-, secondary-, and tertiary-amino groups and precursors thereto and derivatives thereof, e. g., amine acid salt, amine oxide, nitro, imino, nitroso, and the like; acyl groups and precursors thereto and derivatives thereof, e. g., nitrile, carboxyl, carboxyester, primary-, secondary-, and tertiary-carboxamide including the corresponding thiolo and thiono analogs, e. g., carbothiolic, dithio-carboxylic, thionocarboxamide as well as the corresponding sulfonic acid groups including specifically the acid, ester, and primary-, secondary-, and tertiary-amides.

Suitable specific examples of such reactants include where X, Y, and/or Z, at least one of which is a functional group, are: hydrogen or hydrocarbon, the various saturated or unsaturated alkyl, aryl, aralkyl, alkaryl, cycloalkyl, and heterocycles, e. g., isobutane, benzene, toluene, cyclohexadiene, pyridine, quinoline, tetrahydrofuran, thiophene and the like; halogen, e. g., chloroform, benzylbromide, isobutyliodide, and the like; hydroxy and derived functional groups, e. g. nonyl alcohol, methyl benzyl ether, ethyl hydroperoxide, di-tert.-butyl-peroxide, cyclohexane carboxaldehyde, acetone, di-tert.-butylketone, dodecyl mercaptan, methyl butyl thioether, p-methylthiobenzaldehyde, methyl vinyl sulfoxide, tert.-butylvinyl sulfone, and the like; amino groups and precursors thereto and derivatives thereof, e. g., cyclohexylamine, N-methylbenzylamine, methyldiethylamine, aniline hydrochloride, nitrotoluene, nitrosoethylbenzene, iminobispropionitrile, and the like; acyl groups and precursors thereto and derivatives thereof, e. g., benzylnitrile, sebacic acid, tert.-butyl pivalate, benzamide, N-methylcyclohexanecarboxamide, N-methyl-N-tert.-butylpivalic acid amide, cyclohexanecarbothiolic acid, dithioacetic acid, thionohexanoamide, pyridine sulfonic acid, p-toluene sulfonic acid amide, methyl tert.-butyl sulfonate and the like.

Generally, no more than one of X, Y, and Z will be such a functional group at any one time although the specific compounds thereby represented when two or three of X, Y, or Z are such functional groups are specifically included, e. g., difluoromethane, dichloroacetic acid and the like. For ease and convenience in handling, it has been found that the above defined organic reactants should have a critical temperature greater than −20° C. and preferably greater than 0° C. It is to be noted that mixtures of more than one of the above defined organic reactants can be used in the process of this invention in which case mixed products will be obtained. Because of cleaner cut reaction the organic reactants are preferred wherein a fully branched structure exists, such as tert. butyl alcohol, tert. butyl amine, pivalonitrile and the like.

A particularly preferred class of the above defined organic reactants due to the appreciably greater chemical importance of the polyfunctional products obtained therefrom are the above defined organic reactants carrying from one to two functional groups per molecule. Most outstanding of these, due to their readier availability, are those containing a relatively small number of carbons per molecule, usually no more than about twelve carbons and preferably no more than eight carbons per molecule. These organic reactants in aqueous dispersion, including homogeneous and heterogeneous dipersion, when processed according to the foregoing teachings of this invention, will result in the formation of higher molecular weight products containing a greater number of functional groups per molecule.

It has been found essential in carrying out this process that the aqueous dispersion contain at least 5% liquid water. The upper limit of the amount of water really is infinite, since this is only controlling as to the amount of new products formed as a function of time. Reasonable requirements of time and operating costs indicate an upper practical limit of water concentration to be about 1000 parts per part of simple organic reactant or mixtures thereof, i. e., 99.9% liquid water.

The foregoing examples illustrate specifically some particular embodiments of the process of this invention, e. g., using carboxylic acids, nitriles, alcohols to produce hydroxy and hydroperoxy substituted acids and nitriles; glycols, dibasic acids, dinitriles, amino acids, monobasic acids, and the like. However, the invention is not to be limited thereby and the following specific illustrations are also included within the present invention.

For instance, using tert.-butylamine as properly illustrative of the broad class of the foregoing more completely described monofunctional compounds, which are preferably of no more than eight to twelve carbons, the process of this invention will give hydroxy tert.-butylamine, 1,1,4,4-tetramethyltetramethylenediamine, and like products; or using propionamide, there will be obtained hydroxypropionamide, hydroperoxypropionamide, adipamide and other six-carbon dicarboxamides; or similarly using adiponitrile, there will be obtained a twelve-carbon tetracarboxylic acid nitrile as well as hydroxy- or hydroperoxyl-substituted adiponitriles.

Because of their greater importance in many polymer-forming reactions, i. e., in the condensation polymer field and because they are in general more easily obtained by the process of this invention, the preferred products will be those usually of linear structure carrying at least one functional group containing a terminal hydroxy unit, including carboxyl, hydroxyl and groups hydrolyzable thereto, and in particular those containing at least two such groups or precursors thereto. Suitable examples of these preferred compounds have already been illustrated in the examples and in the following further specific exemplification. To list but a few additional such compounds there may be mentioned: glycolonitrile, as obtained from acetonitrile; alpha- and beta-hydroperoxypropionitrile as obtained from propionitrile; alpha-, beta- and gamma-hydroxybutyric and alpha-, beta- and gamma-hydroperoxybutyric acids as obtained from butyric acid; and alpha-methylglutaronitrile, alpha-, beta-dimethylsuccinonitrile and adiponitrile as obtained from propionitrile.

As many apparently widely different embodiments of this invention may be made without departing from the spirit and scope thereof, it is to be understood that this invention is not limited to the specific embodiments thereof except as defined in the appended claims.

I claim:

1. Process which comprises contacting an aqueous dispersion of an organic compound having at least one functional group and a hydrogen-bearing carbon atom with an oxygen-containing fuel combusting mixture having a normal combustion wave, maintaining the aqueous dispersion of said organic compound in intimate mixture with said combusting mixture in a zone where the temperature of said combusting mixture is at least 1500° F. meatured at standard atmospheric pressure, removing the aqueous dispersion thereby obtained from contact with said combusting mixture before complete combustion of said organic compound occurs, collecting the aqueous dispersion thus removed and separating therefrom a monomeric organic product having an additional functional group and of higher molecular weight than the organic compound originally contained in said aqueous dispersion.

2. Process which comprises contacting a liquid water solution of an organic compound having at least one functional group and a hydrogen-bearing carbon atom with an oxygen-containing fuel combusting mixture having a normal combustion wave, maintaining the liquid water solution of said organic compound in intimate mixture with said combusting mixture in a zone where the temperature of said combusting mixture is at least 1500° F. measured at standard atmospheric pressure, removing the liquid water solution thereby obtained from contact with said combusting mixture before complete combustion of said organic compound occurs, collecting the liquid water solution thus removed and separating therefrom a monomeric organic product having an additional functional group and of higher molecular weight than the organic compound originally contained in said liquid water solution.

3. Process which comprises contacting a liquid water solution of an organic compound having at least one functional group and a hydrogen-bearing carbon atom with an oxygen-containing fuel combusting mixture having a normal combustion wave propagated at a velocity of at least 30 cm./sec., maintaining the liquid water solution of said organic compound in intimate mixture with said combusting mixture in a zone where the temperature of said combusting mixture is at least 2500° F. measured at standard atmospheric pressure, removing the liquid water solution thereby obtained from contact with said combusting mixture before complete combustion of said organic compound occurs, collecting the liquid water solution thus removed and separating therefrom a monomeric organic product having an additional functional group and of higher molecular weight than the organic compound originally contained in said liquid water solution.

4. Process which comprises contacting a liquid water solution of an organic compound having at least one functional group and a hydrogen-bearing carbon atom with an oxygen-containing fuel combusting mixture having a normal combustion wave propagated at a velocity of at least 90 cm./sec., maintaining the liquid water solution of said organic compound in intimate mixture with said combusting mixture in a zone where the temperature of said combusting mixture is at least 2500° F. measured at standard atmospheric pressure, removing the liquid water solution thereby obtained from contact with said combusting mixture before complete combustion of said organic compound occurs, collecting the liquid water solution thus removed and separating therefrom a monomeric organic product having an additional functional group and of higher molecular weight than the organic compound originally contained in said liquid water solution.

5. Process which comprises contacting a liquid water solution of an organic compound having at least one functional group and a hydrogen-bearing carbon atom with an oxygen-containing fuel combusting mixture having a normal combustion wave propagated at a velocity of at least 90 cm./sec., maintaining the liquid water solution of said organic compound in intimate mixture with said combusting mixture in a zone where the temperature of said combusting mixture is at least 2500° F. measured at standard atmospheric pressure, removing the liquid water solution thereby obtained from contact with said combusting mixture before the temperature of the liquid water solution is raised to the boiling point of the water component of said liquid water solution, collecting the liquid water solution thus removed and separating therefrom a monomeric organic product having an additional functional group and of higher molecular weight than the organic compound originally contained in said liquid water solution.

6. Process which comprises contacting a liquid water solution of an organic compound having at least one functional group and a hydrogen-bearing carbon atom with an oxygen-containing fuel combusting mixture having a normal combustion wave propagated at a velocity of at least 30 cm./sec., maintaining for a period of .00001 to not more than 5.0 seconds the liquid water solution of said organic compound in intimate mixture with said combusting mixture in a zone where the temperature of said combusting mixture is at least 2500° F. measured at standard atmospheric pressure, then removing the liquid water solution thereby obtained from contact with said combusting mixture, collecting the liquid water solution thus removed and separating therefrom a monomeric organic product having an additional functional group and of higher molecular weight than the organic compound originally contained in said liquid water solution.

7. Process which comprises contacting a liquid water solution of an organic compound having at least one functional group and a hydrogen-bearing carbon atom with an oxygen-containing fuel combusting mixture having a normal combustion wave propagated at a velocity of at least 30 cm./sec., maintaining for a period of .0001 to not more than 1.0 second the liquid water solution of said organic compound in intimate mixture with said combusting mixture in a zone where the temperature of said combusting mixture is at least 2500° F. measured at standard atmospheric pressure, then removing the liquid water solution thereby obtained from contact with said combusting mixture, collecting the liquid water solution thus removed and separating therefrom a monomeric organic product having an additional functional group and of higher molecular weight than the organic compound originally contained in said liquid water solution.

8. Process which comprises contacting an aqueous dispersion of an organic compound having at least one functional group and a hydrogen-bearing carbon atom with an oxygen-containing fuel combusting mixture having a normal combustion wave, maintaining the aqueous dispersion of said organic compound in intimate mixture with said combusting mixture in a zone where the temperature of said combusting mixture is at least 1500° F. measured at standard atmospheric pressure, removing the aqueous dispersion thereby obtained from contact with said combusting mixture before complete combustion of said organic compound occurs, recycling the aqueous dispersion thus removed into intimate mixture with and removing it from said combusting mixture as aforesaid, collecting the aqueous dispersion thereby obtained and separating therefrom a monomeric organic product having an additional functional group and of higher molecular weight than the organic compound originally contained in said aqueous dispersion.

9. Process which comprises contacting a liquid water solution of an organic compound having at least one functional group and a hydrogen-bearing carbon atom with an oxygen-containing fuel combusting mixture having a normal combustion wave propagated at a velocity of at least 30 cm./sec., maintaining the liquid water solution of said organic compound in intimate mixture with said combusting mixture in a zone where the temperature of said combusting mixture is at least 2500° F. measured at standard atmospheric pressure, removing the liquid water solution thereby obtained from contact with said combusting mixture before the temperature of the liquid water solution is raised to the boiling point of the water component of said liquid water solution, recycling the liquid water solution thus removed into intimate mixture with and removing it from said combusting mixture as aforesaid, collecting the liquid water solution thereby obtained and separating therefrom a monomeric organic product having an additional functional group and of higher molecular weight than the organic compound originally contained in said liquid water solution.

10. Process which comprises contacting an aqueous dispersion of a monofunctionally substituted hydrocarbon compound having a hydrogen-bearing carbon atom and of not more than 12 carbon atoms with an oxygen-containing fuel combusting mixture having a normal combustion wave propagated at a velocity of at least 30 cm./sec., maintaining for a period of .00001 to not more than 5.0 seconds the aqueous dispersion of said monofunctionally substituted hydrocarbon compound in intimate mixture with said combusting mixture in a zone where the temperature of said combusting mixture is at least 1500° F. measured at standard atmospheric pressure, then removing the aqueous dispersion thereby obtained from contact with said combusting mixture, collecting the liquid aqueous dispersion thus removed and separating therefrom a monomeric difunctionally substituted hydrocarbon product of higher molecular weight than the monofunctionally substituted hydrocarbon compound originally contained in said aqueous dispersion.

11. Process which comprises contacting a liquid water solution of a monofunctionally substituted hydrocarbon compound having a hydrogen-bearing carbon atom and of not more than 12 carbon atoms with an oxygen-containing fuel combusting mixture having a normal combustion wave propagated at a velocity of at least 30 cm./sec., maintaining the liquid water solution of said monofunctionally substituted hydrocarbon compound in intimate mixture with said combusting mixture in a zone where the temperature of said combusting mixture is at least 1500° F. measured at standard atmospheric pressure, removing the liquid water solution thereby obtained from contact with said combusting mixture before the temperature of the liquid water solution is raised to the boiling point of the water component of said liquid water solution, recycling the liquid water solution thus removed into intimate mixture with and removing it from said combusting mixture as aforesaid, collecting the liquid water solution thereby obtained and separating therefrom a monomeric difunctionally substituted hydrocarbon product of higher molecular weight than the monofunctionally substituted hydrocarbon compound originally contained in said liquid water solution.

12. Process which comprises contacting a liquid water solution of a monofunctionally substituted hydrocarbon compound free from aliphatic unsaturation, having a hydrogen-bearing carbon atom and of not more than 12 carbon atoms, wherein said functional substituent is selected from the class consisting of carboxyl and groups hydrolyzable thereto, with an oxygen-containing fuel combusting mixture having a normal combustion wave propagated at a velocity of at least 30 cm./sec., maintaining for a period of .00001 to not more than 5.0 seconds the liquid water solution of said monofunctionally substituted hydrocarbon compound in intimate mixture with said combusting mixture in a zone where the temperature of said combusting mixture is at least 1500° F. measured at standard atmospheric pressure, then removing the liquid water solution thereby obtained from contact with said combusting mixture, collecting the liquid water solution thus removed and separating therefrom a monomeric difunctionally substituted hydrocarbon product of higher molecular weight than the monofunctionally substituted hydrocarbon compound originally contained in said liquid water solution and having at least one of the functional groups selected from the class consisting of carboxyl and groups hydrolyzable thereto.

13. Process which comprises contacting a liquid water solution of a monofunctionally substituted hydrocarbon compound free from aliphatic unsaturation, having a hydrogen-bearing carbon atom and of not more than 12 carbon atoms, wherein said functional substituent is selected from the class consisting of carboxyl and groups hydrolyzable thereto, with an oxygen-containing fuel combusting mixture having a normal combustion wave propagated at a velocity of at least 30 cm./sec., maintaining the liquid water solution of said monofunctionally substituted hydrocarbon compound in intimate mixture with said combusting mixture in a zone where the temperature of said combusting mixture is at least 1500° F. measured at standard atmospheric pressure, removing the liquid water solution thereby obtained from contact with said combusting mixture before the temperature of the liquid water solution is raised to the boiling point of the water component of said liquid water solution, recycling the liquid water solution thus removed into intimate mixture with and removing it from said combusting mixture as aforesaid, collecting the liquid water solution thereby obtained and separating therefrom a monomeric difunctionally substituted hydrocarbon product of higher molecular weight than the monofunctionally substituted compound originally contained in said liquid water solution and having at least one of the functional groups selected from the class consisting of carboxyl and groups hydrolyzable thereto.

14. A saturated aliphatic hydroperoxide having the general formula HOORX wherein HOO is the hydroperoxy group, R is a divalent saturated aliphatic hydrocarbon radical of no more than six carbon atoms which is directly attached to the hydroperoxy group by a hydrogen-bearing carbon atom and X is a group selected from the class consisting of carboxyl and groups hydrolyzable directly thereto.

15. A saturated aliphatic hydroperoxide having the general formula HOORX wherein HOO is the hydroperoxy group, R is a divalent saturated aliphatic hydrocarbon radical of no more than six carbon atoms which is directly attached to the hydroperoxy group by a primary carbon atom and X is carboxyl.

16. Hydroperoxyacetic acid.

17. Hydroperoxypivalic acid.

18. Process which comprises contacting a liquid water solution of an aliphatically saturated hydrocarbon monocarboxylic acid having a hydrogen-bearing carbon atom and of not more than 12 carbon atoms with an oxygen-containing fuel combusting mixture having a normal combustion wave propagated at a velocity of at least 30 cm./sec., maintaining the liquid water solution of said aliphatically saturated hydrocarbon monocarboxylic acid in intimate mixture with said combusting mixture in a zone where the temperature of said combusting mixture is at least 1500° F. measured at standard atmospheric pressure, removing the liquid water solution thereby obtained from contact with said combusting mixture before the temperature of the liquid water solution is raised to the boiling point of the water component of said liquid water solution, recycling the liquid water solution thus removed into intimate mixture with and removing it from said combusting mixture as aforesaid, collecting the liquid water solution thereby obtained and separating therefrom an aliphatically saturated hydrocarbon dicarboxylic acid as a resulting product.

19. Process as set forth in claim 18 wherein said aliphatically saturated hydrocarbon monocarboxylic acid is pivalic acid and said aliphatically saturated hydrocarbon dicarboxylic acid resulting product is 2,2,5,5-tetramethyladipic acid.

20. Process as set forth in claim 18 wherein said aliphatically saturated hydrocarbon monocarboxylic acid is acetic acid and said aliphatically saturated hydrocarbon dicarboxylic acid resulting product is succinic acid.

21. Process as set forth in claim 18 wherein said aliphatically saturated hydrocarbon monocarboxylic acid is propionic acid and said aliphatically saturated hydrocarbon dicarboxylic acid resulting product is adipic acid.

22. Process which comprises contacting a liquid water solution of pivalic acid with an oxygen-containing gaseous fuel combusting mixture having a normal combustion wave propagated at a velocity of at least 30 cm./sec., maintaining for a period of .00001 to not more than 5.0 seconds the liquid water solution of said pivalic acid in intimate mixture with said combusting mixture in a zone where the temperature of said combusting mixture is at least 1500° F. measured at standard atmospheric pressure, removing the liquid water solution thereby obtained from contact with said combusting mixture, collecting the liquid water solution thus removed, recycling the liquid water solution thus removed into intimate mixture with and removing it from said combusting mixture as aforesaid, collecting the liquid water solution thereby obtained and separating therefrom 2,2,5,5-tetramethyladipic acid as a resulting product.

23. Process which comprises contacting a liquid water solution of an aliphatically saturated hydrocarbon mononitrile having a hydrogen-bearing carbon atom and of not more than 12 carbon atoms with an oxygen-containing fuel combusting mixture having a normal combustion wave propagated at a velocity of at least 30 cm./sec., maintaining the liquid water solution of said aliphatically saturated hydrocarbon mononitrile in intimate mixture with said combusting mixture in a zone where the temperature of said combusting mixture is at least 1500° F. measured at standard atmospheric pressure, removing the liquid water solution thereby obtained from contact with said combusting mixture before the temperature of the liquid water solution is raised to the boiling point of the water component of said liquid water solution, recycling the liquid water solution thus removed into intimate mixture with and removing it from said combusting mixture as aforesaid, collecting the liquid water solution thereby obtained and separating therefrom an aliphatically saturated hydrocarbon dinitrile as a resulting product.

24. Process as set forth in claim 23 wherein said aliphatically saturated hydrocarbon mononitrile is pivalonitrile and said aliphatically saturated hydrocarbon dinitrile resulting product is 2,2,5,5-tetramethyladiponitrile.

25. Process which comprises contacting a liquid water solution of an aliphatically saturated hydrocarbon alcohol having a hydrogen-bearing carbon atom and of not more than 12 carbon atoms with an oxygen-containing fuel combusting mixture having a normal combustion wave propagated at a velocity of at least 30 cm./sec., maintaining the liquid water solution of said aliphatically saturated hydrocarbon alcohol in intimate mixture with said combusting mixture in a zone where the temperature of said combusting mixture is at least 1500° F. measured at standard atmospheric pressure, removing the liquid water solution thereby obtained from contact with said combusting mixture before the temperature of the liquid water solution is raised to the boiling point of the water component of said liquid water solution, recycling the liquid water solution thus removed into intimate mixture and removing it from said combusting mixture as aforesaid, collecting the liquid water solution thereby obtained and separating therefrom an aliphatically saturated hydrocarbon glycol as a resulting product.

26. Process as set forth in claim 25 wherein said aliphatically saturated hydrocarbon alcohol is tert.-butyl alcohol and said aliphatically saturated hydrocarbon glycol resulting product is 1,1,4,4-tetramethyl tetramethylene glycol.

References Cited in the file of this patent

UNITED STATES PATENTS

| | | |
|---|---|---|
| 2,508,256 | Harman | May 16, 1950 |
| 2,532,687 | Weichselbaum | Dec. 5, 1950 |
| 2,568,682 | Levesque | Sept. 18, 1951 |
| 2,605,291 | Barusch et al. | July 29, 1952 |

OTHER REFERENCES

Bennett Chem. Abstracts, vol. 21, pg. 3824 (1927).
Prettre Chem. Abstracts, vol. 32, col. 5271 (1938).
Neiman Chem. Abstracts, vol. 33, col. 4855 (1939).
Mukherjee Chem. Abstracts, vol. 45, col. 10617 (1951).